Nov. 12, 1940.　　　　C. S. COOK　　　　2,220,890
TRACTION VEHICLE
Filed Aug. 18, 1938　　　　4 Sheets-Sheet 1
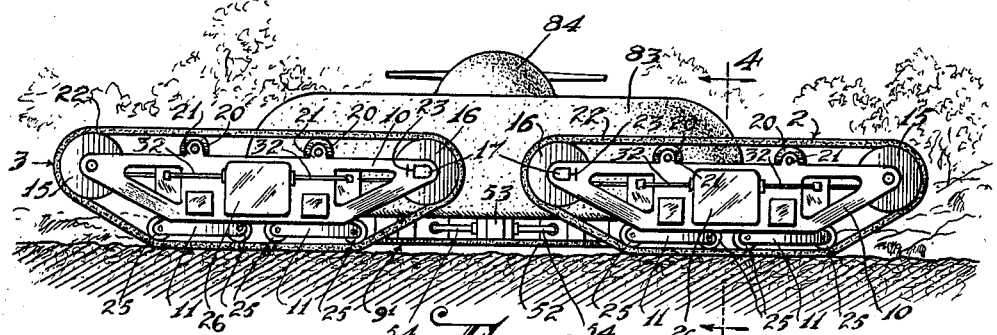
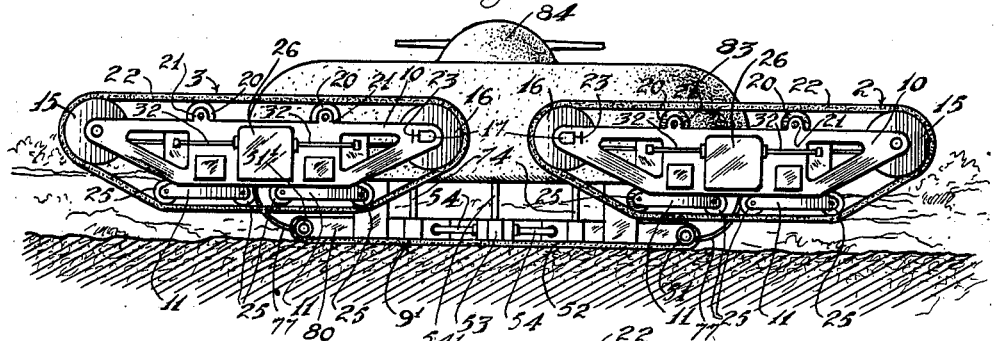
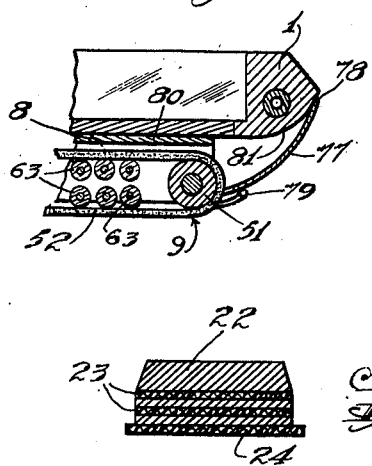
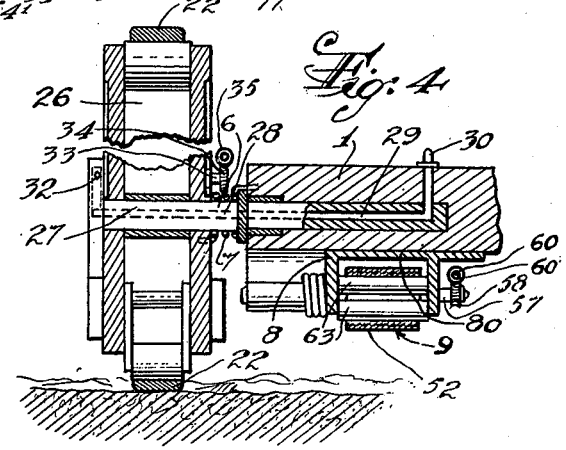
INVENTOR
Charles S. Cook
BY
ATTORNEY Nov. 12, 1940.  C. S. COOK  2,220,890
TRACTION VEHICLE
Filed Aug. 18, 1938  4 Sheets-Sheet 2
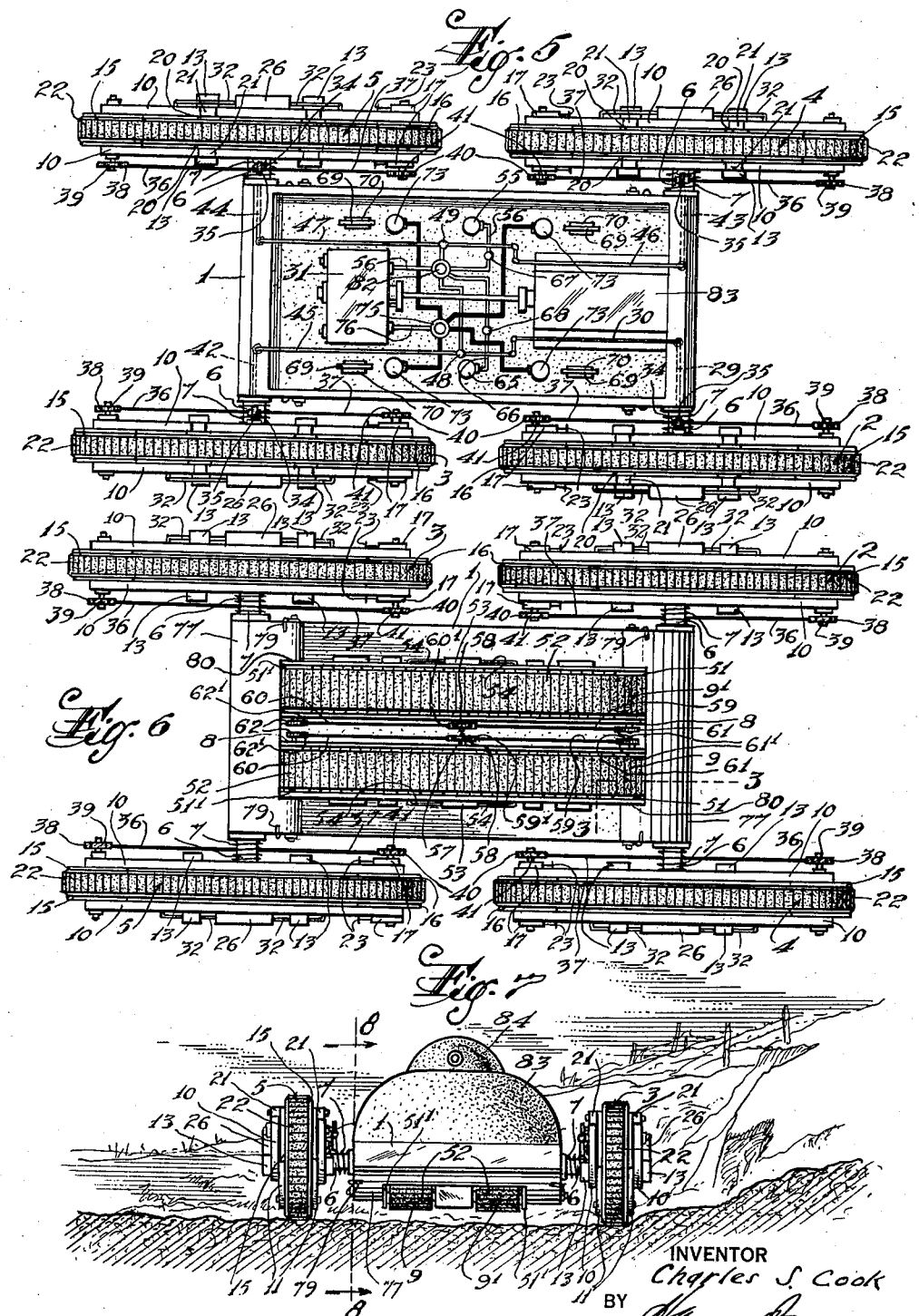
INVENTOR
Charles S. Cook
BY
ATTORNEY INVENTOR
Charles S. Cook
BY
ATTORNEY Nov. 12, 1940. C. S. COOK 2,220,890
TRACTION VEHICLE
Filed Aug. 18, 1938 4 Sheets-Sheet 4
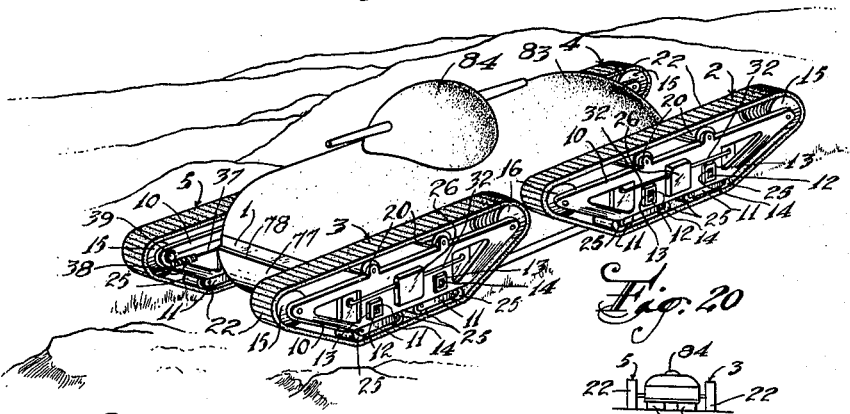
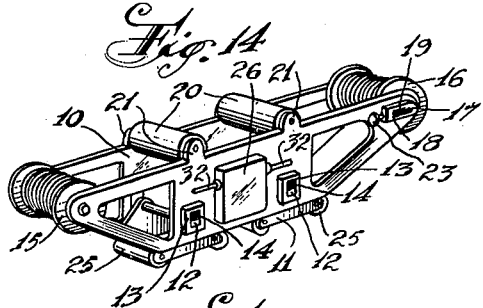
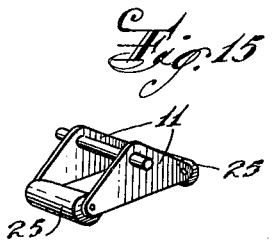
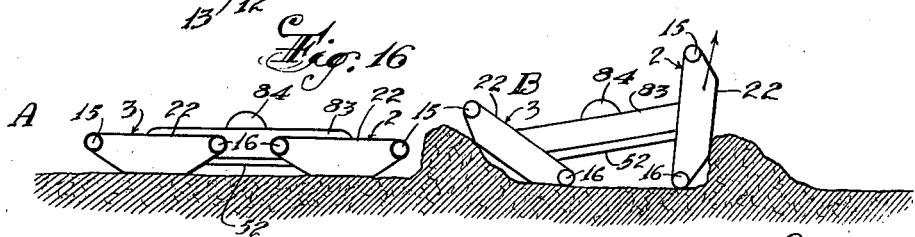
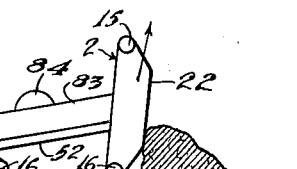
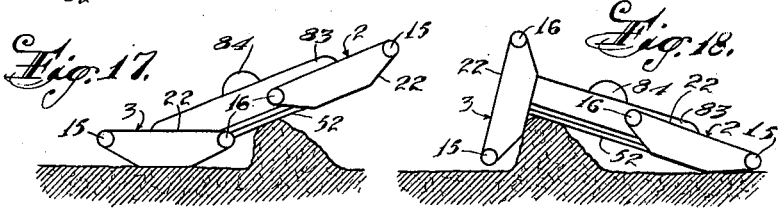
INVENTOR
Charles S. Cook
BY
ATTORNEY Patented Nov. 12, 1940

2,220,890

UNITED STATES PATENT OFFICE 2,220,890

TRACTION VEHICLE

Charles S. Cook, Livingston, N. J.

Application August 18, 1938, Serial No. 225,495

9 Claims. (Cl. 180—9.1)

This invention relates to improvements in traction vehicles. An object of my invention is to provide a traction vehicle adapted to be used as a tank for military purposes, and as a heavy-duty tractor for civil purposes.

A further object of my invention is to provide a vehicle of the character described which is provided with self contained motor traction units for actuating the vehicle, said units being independently secured to the vehicle chassis, in an arrangement providing inherent stability and a low center of gravity.

A further object of my invention is to provide the vehicle with one or more median traction units secured to the underside of the chassis, adapted to be actuated independently of or in cooperation with the other motor traction units.

A further object of my invention is to provide the vehicle with means for selectively holding the median traction unit in raised, inoperative position at the underside of the chassis, or to lower the unit to the level of the other units for tractive cooperation therewith, or to lower the unit below the level of the other units to constitute the sole tractive means for the vehicle.

A further object of my invention is to provide a vehicle of this character so constructed as to enable it to have a chassis of far greater length and carrying capacity than has been practical heretofore, and which will accommodate itself to the topography of the terrain traversed, climbing obstacles without danger of becoming wedged thereon, and which will not "bog down" on soft ground.

A further object of my invention is to provide the vehicle with features of inherent strength and rigidity.

A further object of my invention is to provide a vehicle which need not be abandoned upon the disablement of one or more of its outer motor traction units but may be driven to safety on the median unit.

Figure 8:
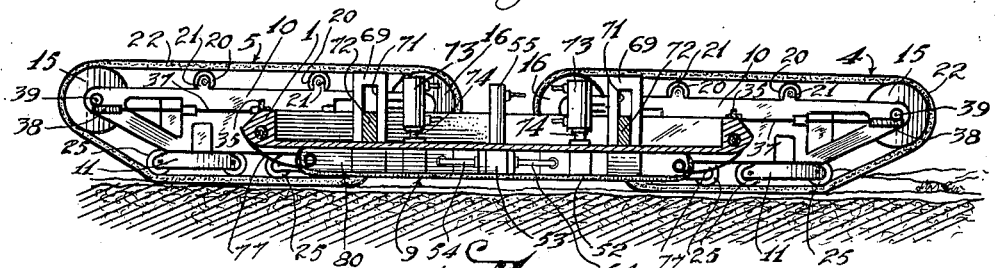
Figure 9:
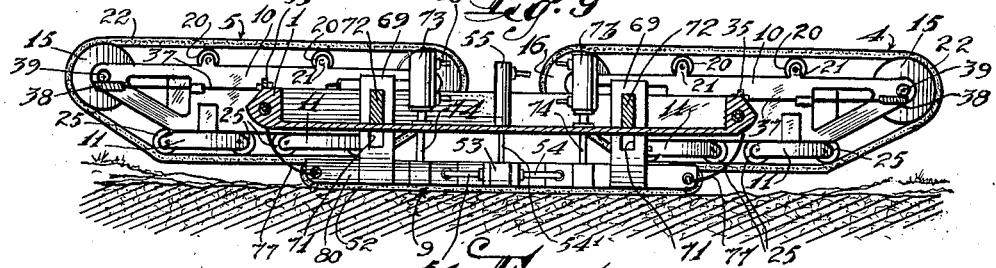
Figure 10:
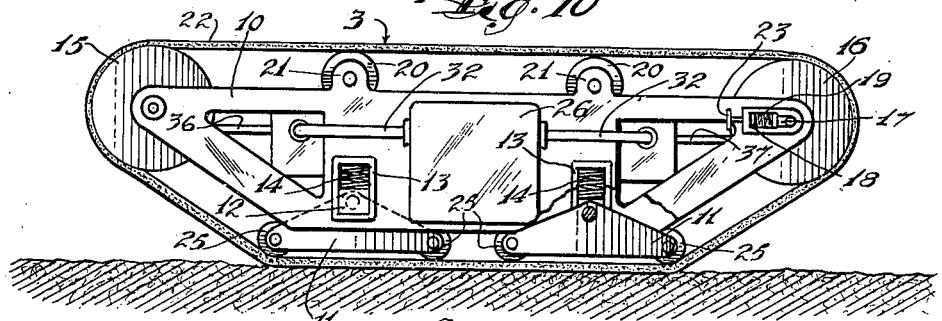
Figure 11:
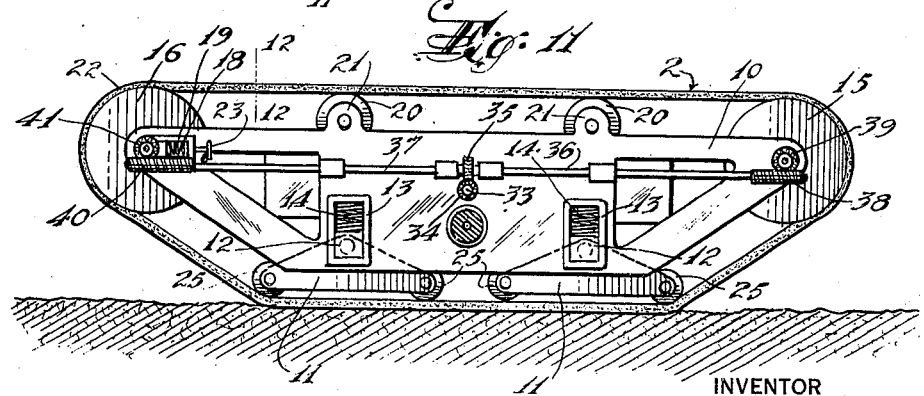

In the accompanying drawings:

Fig. 1 is a side elevational view of a traction vehicle embodying my invention,

Fig. 2 is a similar view showing the vehicle supported on the median traction unit, the latter being shown in its lowermost position, Fig. 3 is a fragmentary longitudinal sectional view taken on line 3—3 of Fig. 6, Fig. 4 is a fragmentary transverse sectional view taken on line 4—4 of Fig. 1 in the direction of the arrows, Fig. 5 is a top plan view of the traction vehicle, with the body removed to reveal details of the chassis and controls, Fig. 6 is an underplan view of the vehicle, Fig. 7 is an end elevational view thereof, Fig. 8 is a side elevational, partly sectional view thereof taken on line 8—8 of Fig. 7, in the direction of the arrows, with the body omitted, Fig. 9 is a similar view showing the vehicle supported on the median traction unit, Fig. 10 is a side elevational view, partly in section, of a traction unit embodying my invention, Fig. 11 is a similar view of the other side of the unit, Fig. 12 is a vertical transverse sectional view of the endless belt of my vehicle, taken on line 12—12 of Fig. 11, Fig. 13 is a perspective view of the vehicle of my invention, Fig. 14 is a perspective view of a traction unit embodying my invention, Fig. 15 is a perspective view of a guide member forming part of the traction unit, Fig. 16 is a diagrammatic, side elevational view of the traction vehicle of my invention, on level ground at A, and traversing obstacles at B, Fig. 17 is a similar view of the machine traversing the obstacle shown, Fig. 18 is a similar view showing the position of the vehicle in its continued movement over the obstacle, Fig. 19 is a similar view showing the position of the vehicle in traversing irregular terrain and, Fig. 20 is a diagrammatic end elevational view showing the machine with the median traction unit lowered to the level of the corner traction units.

The traction vehicle of my invention comprises a chassis 1 provided with sturdy trunnions 6 at the corners thereof; corner traction units 2, 3, 4 and 5 are secured to the trunnions 6 for free rocking movement thereon and are normally held in a plane parallel to that of the chassis by springs 7 secured at opposite ends of the units and to the chassis, or by any other suitable means.

The chassis is provided with a casing 8 adapted to be lowered and raised relatively to the chassis and to be normally held in abutment with the underside thereof by means hereinafter described. The casing 8 is provided with median traction units 9—9' so that when the casing abuts the underside of the chassis 1 as in Figs. 1, 8, 17, the traction units 9, 9' enable the vehicle to clear obstacles on which it might otherwise become wedged; when the casing 8 is lowered only to the level of the corner units 2, 3, 4, 5 as in Fig.

20, the median traction units 9, 9' cooperate with the corner units; when the casing 8 is lowered to the position shown in Fig. 2, the median traction units 9, 9' provide the sole traction means for the vehicle.

It will be noted from Figs. 16, 17, 18 and 19 that the vehicle of my invention accommodates itself to the obstacles and topography of the terrain traversed. While the corner traction units 2, 3, 4, 5 pivot into planes parallel with those of the surfaces encountered, the chassis 1 remains on a relatively horizontal plane. My invention makes it practical to provide the vehicle with a chassis of far greater length and carrying capacity than has heretofore been practical; the vehicle is low and squat and is adapted to easily execute the most intricate maneuvers.

As shown in Fig. 14, the corner traction unit 2 comprises the frame 10 having belt guide members 11 journalled in members 12, the latter being vertically slidable in guideways 13, and normally held in the lower ends of said guideways by springs 14. The belt guide members 11 are provided with a plurality of rollers 25 journalled therein in any desired or convenient manner. A pulley 15 is journalled in an upper end of the frame 10. A pulley 16 is journalled in members 17 which are slidable in guideways 18 and are normally held in the outer ends of said guideways by springs 19 or the like. The frame 10 is further provided with a pair of rollers 20 preferably journalled in lugs 21 of the frame 10; an endless belt 22 passes over the pulleys 15 and 16 and rollers 20 and 25. The belt 22 is preferably of rubber, as shown cross sectionally in Fig. 12, molded over one or more continuous steel chains 23 for reenforcement, with an endless band of steel 24 secured to the lower surface of the belt and preferably molded integral therewith, extending beyond the side edges of the belt.

The belt 22 is held taut on the frame by means of pulley 16; the tension of spring 19 is adjustable by means of the screw 23 passing through the guideway 18 and bearing against the spring 19 or by any other suitable means. The pulleys 15 and 16 are preferably roughly faced for positive engagement with the belt 22.

The pulleys 15 and 16, which drive the belt 22, are preferably actuated by a motor 26 mounted in the frame 10. The motor 26 may be of any desired or convenient type; in the drawings, the motor 26 is shown as an air motor having an intake manifold 32 which is provided with compressed air through the longitudinal duct 27 (see Fig. 4) which communicates with opening 28 in the trunnion 6, the latter communicating with duct 29 in chassis 1, which in turn communicates with the air line 30 of compressor 31.

Either or both of the pulleys 15, 16 are geared to the motor 26 by any desired or convenient train of gearing. Preferably, as shown in the drawing, the shaft 33 of motor 26 is provided with a gear 34 meshing with gear 35 keyed to shafts 36, 37. Shaft 36 has keyed to the outer end thereof a gear 38 in mesh with gear 39 keyed to the shaft of pulley 15. Shaft 37 has keyed to the outer end thereof a gear 40 in mesh with gear 41 keyed to the shaft of pulley 16. Gear 40 is preferably an elongated, continuous gear which constantly meshes with gear 41 notwithstanding movement of pulley 16 (and its gear 41) in a horizontal plane. The structure described in connection with traction unit 2 applies equally to units 3, 4 and 5; corresponding parts are correspondingly numbered.

Ducts 42, 43 and 44 of chassis 1 communicate with openings in the trunnions of units 3, 4 and 5 respectively, corresponding to the opening 28 of the trunnion 6 of unit 2, said ducts communicating with air lines 45, 46 and 47, respectively, of compressor 31.

The traction unit 9 of casing 8 is positioned in the open frame 80 of the casing and is provided with pulleys 51 and 51' journalled in opposite ends of frame 80, the endless belt 52 passing over said pulleys.

A motor 53 is carried by the frame 80; the shaft 57 (see Fig. 6) of said motor is provided with a gear 58 in mesh with the gears 59', 60' of shafts 59, 60, whose outer ends are provided with gears 61', 62' meshing with gears 61, 62 keyed to the shafts of pulleys 51, 51', respectively, thus driving the belt 52. A plurality of idler rollers 63 (see Fig. 3) are journalled in the frame 80, the belt 52 passing over said rollers. The traction unit 9 may be made of substantially the width of the casing 8 or, as shown in the drawings, it may be of substantially less width but operating in conjunction with an additional unit 9'; the description of unit 9 applies to the correspondingly numbered parts in unit 9'.

The motors 53 of units 9, 9' are carried by the frame 80 and are provided with compressed air through manifolds 54 provided with pipes 54' having sealed, vertical sliding connection of any conventional or convenient style with the chambers 55, 65, respectively, which communicate with the air lines 56, 66, respectively, of compressor 31.

The casing 8 is adapted to be lowered or raised relatively to the chassis and to be normally held in abutment with the underside of the chassis by any suitable means. As shown in the drawings, this end may be attained by providing the casing with a plurality of vertical guide plates 69 (see Fig. 9) passing through openings 70 in the chassis 1, the plates 69 having elongated apertures 71 through which the studs 72 of chassis 1 pass to maintain the vertical alignment of the casing 8 in its movement relatively to the chassis. The casing 8 is lowered and raised relatively to the chassis 1 by any suitable means, as by hydraulic jacks 73 carried by and operable from the chassis 1, the lower ends of the pistons 74 of said jacks being secured to the casing 8. The jacks 73 are preferably controlled through a valve of any desired or convenient type—for example, as shown in Fig. 5, the valve 75 supplied with compressed air by the air line 76 of compressor 31, valve 75 communicating with each jack 73.

The casing 8 is preferably provided at each end thereof with a curved guard plate 77 of substantially the width of the casing and pivotally secured thereto (see Fig. 3), the free edges 78 of said plates being held by springs 79 in abutment with the curved edges 81 of chassis 1. By this arrangement, the guard plates 77 engage the edges 81 of chassis 1 at all times, notwithstanding the vertical movement of the casing 8 relatively to the chassis as occasion requires. The guard plates 77 prevent the wedging of objects in the casing 8, deflecting the objects downward so that the vehicle may safely pass thereover.

The units 2 and 3 are preferably operated in synchronism by means of a calibrated valve 48, and the units 4 and 5 are preferably operated in synchronism by means of calibrated valve 49. Calibrated valves 67, 68 are interposed in the air lines 56, 66, respectively, for controlling the supply of compressed air to the motors of median units 9, 9'.

In the embodiment of my invention shown in the drawings, which is one of a number of forms the invention may take, the compressor 31 is provided with a motor 83 of any desired or convenient type, mounted on the chassis 1, and with an air line 56 having a king valve or throttle 82. The valves 67, 68 of median units 9, 9', respectively, and valves 48, 49 of corner units 2—3, 4—5, are connected with the king valve 82 by air lines as shown in Fig. 5, so that, by opening all valves and then regulating the king valve or throttle 82, all units may be operated at synchronous speed. When the casing 8 is in its raised position, abutting the underside of chassis 1, and units 9, 9', 2—3, 4—5 are operated at synchronous speed, the vehicle will climb obstacles as in Figs. 16, 17, 18, 19, the units 9, 9' engaging the peaks of the obstacles and moving the vehicle thereover.

The valves 48, 49 enable the operation of the units 2—3, 4—5 at different synchronous speeds for the purpose of turning the vehicle or for maneuvers.

The valves 67, 68 of median units 9, 9' enable each of said units to be synchronized with the speed of adjacent units 2—3, 4—5, so that units 9', 2—3 may be operating at a given synchronous speed while units 9, 4—5 are operating at a different synchronous speed, to turn the vehicle and for maneuvers.

Valves 67 and 68 further enable the vehicle to be turned on units 9, 9' when the casing is in its lowermost position, shown in Fig. 2.

The vehicle is preferably provided with means for reversing the traction unit motors to provide maximum flexibility of operation and facility of maneuver. This end may be attained by utilizing any satisfactory or conventional means suited for reversing the particular motors used. In the use of air motors, as in the embodiment of the invention shown in the drawings, any conventional lever or other means for reversing air motors may be used, said means being incorporated in the structure of valves 48, 49, 67 and 68 and operable in conjunction therewith, or provided on the chassis 1 and operable apart from the valves.

When the casing 8 is lowered to bring units 9, 9' to the level of units 2—3, 4—5, as shown in Fig. 20, the vehicle will present a large area of endless belts, so that it will not bog down in soft ground and will provide adequate foundation to take up the recoil and weight of heavy guns which may be fired from or carried by the vehicle.

The body 83 of the vehicle may be of any desired or convenient configuration and structure, mounted on chassis 1 by any suitable means, and having one or more turrets 84. As shown in the drawings, the vehicle is preferably of the same construction at both ends, and is therefore reversible.

The units 2—3, 4—5 being secured to the chassis 1 at the corners thereof, have been called "corner traction units," while the units 9, 9', secured to the chassis 1 intermediate the length thereof, have been termed "median traction units."

The vehicle of my invention may be manually operated or may be provided with remote control responsive apparatus connected to the various controls, for operation by remote control.

The corner traction units will be preferably adapted to run at high speeds, while the median units will be low-speed units, but this arrangement may be altered as expediency and circumstances dictate, within the purview of my invention.

The chassis 1 may be loaded with high explosives and the vehicle operated by remote control to direct it to the desired objective, where its explosives will be set off by remote control or by striking the objective—the vehicle, in such case, would act as a "land torpedo."

Having thus described my invention, what I claim as new and desire to secure by Letters Patent, is:

1. A traction vehicle comprising a chassis, endless corner traction units secured thereto, a median endless traction unit secured to said chassis, independent motor means contained within each of said units, and control means carried by the chassis and operatively connected with said motor means for actuating the corner traction units and median unit in cooperation with or independently of each other.

2. A traction vehicle comprising a chassis, a traction unit secured thereto, means secured to said chassis and traction unit to elevate and lower said unit in direct vertical alignment relatively to the chassis, and directly vertical complementary plate and stud aligning means carried by said chassis and traction unit.

3. A traction vehicle comprising a chassis, trunions secured to said chassis at the corners thereof, endless traction units secured to said trunions and rockable thereon, a median endless traction unit secured centrally to the underside of said chassis, and means secured to said chassis and last-mentioned traction unit to elevate and lower said unit relatively to said chassis.

4. A traction vehicle comprising a chassis, endless traction units secured to the corners thereof, a vertically movable median endless traction unit arranged on the underside of the chassis, and means for selectively moving said median unit to a position in which its ground engaging surface will be substantially below the plane of the corresponding surfaces of the corner traction units so that the vehicle may be supported by the median unit, and to a position in which its ground engaging surface will be substantially above the plane of the corresponding surfaces of the corner traction units so that the vehicle may be supported by the corner traction units.

5. A traction vehicle comprising a chassis, endless traction units secured to the corners thereof, a vertically movable median endless traction unit arranged on the underside of the chassis, and means for selectively moving said median unit to a position in which its ground engaging surface will be in substantially the plane of the corner traction units for cooperation therewith and to a position in which its ground engaging surface will be substantially above the plane of the corresponding surfaces of the corner traction units so that the vehicle may be supported by the corner traction units.

6. A traction vehicle comprising a chassis, endless traction units secured to the corners thereof, a vertically movable median endless traction unit arranged on the underside of the chassis, and means for selectively moving said median unit to a position in which its ground engaging surface will be in substantially the plane of the corner traction units for cooperation therewith and to a position in which its ground engaging surface will be substantially above the plane of the corresponding surfaces of the corner traction units so that the vehicle may be supported by the corner traction units, and to a position in which its ground engaging surface will be substantially below the plane of the corresponding surfaces of the corner traction units so that the vehicle may be supported by the median unit.

7. A traction vehicle comprising a chassis, a vertically movable endless traction unit arranged on the underside thereof, a deflector plate secured to the front of said unit, and means for holding the deflector plate in constant abutting engagement with the chassis.

8. A traction vehicle comprising a chassis, a pair of traction units secured thereto, means secured to said chassis and traction units to elevate and lower said units in direct vertical alignment relatively to the chassis, complementary directly vertical aligning means carried by said chassis and traction units and means carried by said chassis and operatively connected with said units to regulate the speed and direction of rotation of said units for maneuvering purposes.

9. A traction vehicle comprising a chassis, trunnions secured to said chassis at the corners thereof, endless traction units secured to said trunnions and rockable thereon, a pair of median endless traction units secured centrally to the underside of said chassis, means secured to said chassis and last mentioned traction units to elevate and lower said units relatively to said chassis, and means carried by said chassis and operatively connected with said units to regulate the speed and direction of rotation of said units for maneuvering purposes.

CHARLES S. COOK.